United States Patent
Ota

(10) Patent No.: US 11,137,290 B2
(45) Date of Patent: Oct. 5, 2021

(54) ACCESSORY FOR INFRARED SPECTROPHOTOMETER

(71) Applicant: Shimadzu Corporation, Kyoto (JP)

(72) Inventor: Hiroshi Ota, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 42 days.

(21) Appl. No.: 16/759,169

(22) PCT Filed: Nov. 7, 2017

(86) PCT No.: PCT/JP2017/040036
§ 371 (c)(1),
(2) Date: Apr. 24, 2020

(87) PCT Pub. No.: WO2019/092772
PCT Pub. Date: May 16, 2019

(65) Prior Publication Data
US 2021/0164838 A1   Jun. 3, 2021

(51) Int. Cl.
*G01J 3/44* (2006.01)
*G01J 3/02* (2006.01)
(Continued)

(52) U.S. Cl.
CPC ............ *G01J 3/44* (2013.01); *G01J 3/0205* (2013.01); *G01N 21/65* (2013.01); *G01N 21/552* (2013.01)

(58) Field of Classification Search
CPC .......... G01J 3/44; G01J 3/0205; G01N 21/65; G01N 21/552
See application file for complete search history.

(56) References Cited

U.S. PATENT DOCUMENTS

| 2013/0063714 A1* | 3/2013 | Izzia ...................... G01N 21/65 356/51 |
| 2015/0192462 A1* | 7/2015 | Schiering .............. G01J 3/0256 250/208.2 |
| 2016/0003676 A1* | 1/2016 | Fukuda ................. G01J 3/0275 250/339.08 |

FOREIGN PATENT DOCUMENTS

| JP | 2003294618 A | 10/2003 |
| JP | 4131248 B    | 6/2008  |

(Continued)

OTHER PUBLICATIONS

Written Opinion of the International Searching Authority for PCT application No. PCT/JP2017/040036, dated Jan. 23, 2018, submitted with a machine translation.

*Primary Examiner* — Michael C Bryant
(74) *Attorney, Agent, or Firm* — Muir Patent Law, PLLC

(57) ABSTRACT

An accessory for an infrared spectrophotometer is provided in which both an infrared spectrum and a Raman spectrum at the same measurement position of a sample can be easily acquired. By incorporating an infrared optical system and an excitation light source into the accessory for an infrared spectrophotometer, infrared light from an infrared light source of the infrared spectrophotometer and excitation light from the excitation light source provided for the accessory are guided to the same measurement position P in the sample S. A total reflection spectrum is acquired by detecting the totally reflected light from the sample S irradiated with the infrared light by an infrared detector of the infrared spectrophotometer. Raman scattered light from the sample S irradiated with the excitation light is detected by a Raman detector provided in the accessory. By incorporating the accessory into the infrared spectrophotometer and measuring the sample S, both the infrared spectrum (total reflection (Continued)

spectrum) and the Raman spectrum at the same measurement position P of the sample S can be easily acquired.

5 Claims, 5 Drawing Sheets

(51) Int. Cl.
  *G01N 21/65* (2006.01)
  *G01N 21/552* (2014.01)

(56) References Cited

FOREIGN PATENT DOCUMENTS

| | | |
|---|---|---|
| JP | 2014526686 A | 10/2014 |
| WO | 2014132379 A1 | 9/2014 |

* cited by examiner

ACCESSORY FOR INFRARED SPECTROPHOTOMETER

TECHNICAL FIELD

The present invention relates to an accessory for an infrared spectrophotometer capable of being incorporated between an infrared light source and an infrared detector of an infrared spectrophotometer that irradiates a sample with infrared light from the infrared light source and detect reflected light from the sample by the infrared detector.

BACKGROUND OF THE INVENTION

For example, some analyzers, such as, e.g., an infrared spectrophotometer, include a spectrum measurement device capable of measuring a spectrum using an ATR (Attenuated Total Reflectance) method or a DRS (Diffuse Reflectance Spectroscopy) (see, e.g., Patent Document 1 below).

In an attenuated total reflectance method, a prism having a refractive index greater than that of a sample is brought into contact with the sample and the sample is irradiated with infrared light via the prism at an incident angle equal to or greater than the total reflectance critical angle. At this time, although the infrared light is totally reflected at the boundary surface (measurement position) between the prism and the sample, the infrared light slightly (e.g., several µm) exceeds the boundary surface and enters the sample side, and is subjected to inherent absorption of the surface of the sample. Therefore, the infrared spectrum (total reflection spectrum) can be measured by detecting the totally reflected light from the surface of the sample with the detector.

In a diffuse reflectance method, for example, a powdered sample is mixed with a powder of an infrared-transmission material, such as, e.g., potassium bromide (KBr), and the mixture is irradiated with infrared light. At this time, the infrared spectrum (diffuse reflectance spectrum) can be measured by detecting the light (diffuse reflected light) that has entered the interior of the mixture and has repeatedly been transmitted and reflected with a detector.

On the other hand, a spectrum measurement device is also known in which a Raman spectrum can be measured by irradiating a sample with laser light (excitation light rays) and detecting the Raman scattered light from the sample. In this type of a spectrum measurement device, Rayleigh scattered light scattered at the same wavelength as the incident light and Raman scattered light scattered at a wavelength different from the incident light by molecular vibrations are generated from the sample on which laser light is incident. Among scattered light generated in this manner, the Raman spectrum can be measured by dispersing the Raman scattered light.

PRIOR ART DOCUMENT

Patent Document

Patent Document 1: Japanese Patent No. 4131248

SUMMARY OF THE INVENTION

Problems to be Solved by the Invention

Infrared spectroscopy, such as, e.g., an attenuated total reflectance method and a diffuse reflectance method, is a useful technique for a qualitative analysis of a chemical substance. However, in infrared spectroscopy, since an infrared spectrum is measured based on the infrared absorption caused by molecular vibrations, although it is possible to acquire the infrared spectrum due to the infrared active molecular structure of the sample, the structure of the sample cannot completely be determined. On the other hand, by using Raman spectroscopy for detecting the Raman scattered light from the sample, it is possible to acquire the detailed information on the molecular structure of the sample based on the Raman spectrum due to the molecular structure active in the Raman scattering of the sample.

As described above, infrared spectroscopy and Raman spectroscopy differ from each other in sample information acquired by measuring a spectrum. For this reason, conventionally, a spectrum measurement device for measuring an infrared spectrum by infrared spectroscopy and a spectrum measurement device for measuring a Raman spectrum by Raman spectroscopy are prepared as separate devices, and the measurements are individually performed by the respective devices. Therefore, it takes time and labor to acquire both the infrared spectrum and the Raman spectrum, and it is difficult to acquire spectrums at the same measurement position of the sample.

The present invention has been made in view of the aforementioned circumstances, and an object of the present invention is to provide an accessory for an infrared spectrophotometer capable of easily obtaining both an infrared spectrum and a Raman spectrum at the same measurement position of a sample.

Means for Solving the Problem

An accessory for an infrared spectrophotometer according to the present invention is configured to be incorporated between an infrared light source and an infrared detector of an infrared spectrophotometer, the infrared spectrophotometer being configured to irradiate a sample with infrared light from the infrared light source and detect reflected light from the sample with the infrared detector, the accessory includes a prism, an infrared optical system, an excitation light source, a Raman spectrometer, and a Raman detector. The prism is brought into contact with a sample. The infrared optical system is configured to irradiate a measurement position positioned at a boundary between the sample and the prism with the infrared light from the infrared light source and guide totally reflected light from the sample to the infrared detector. The excitation light source is configured to irradiate the measurement position with excitation light. The Raman spectrometer is configured to disperse Raman scattered light from the sample irradiated with the excitation light. The Raman detector is configured to detect dispersed Raman scattered light.

According to the above-described configuration, by incorporating the infrared optical system and the excitation light source into an accessory for an infrared spectrophotometer, it is possible to irradiate the same measurement position in the sample with the infrared light from the infrared light source of the infrared spectrophotometer and the excitation light from the excitation light source provided in the accessory. The total reflection spectrum can be acquired by detecting the totally reflected light from the sample irradiated with the infrared light by the infrared detector of the infrared spectrophotometer, and the Raman spectrum can be acquired by detecting the Raman scattered light from the sample irradiated with the excitation light by the Raman detector provided in the accessory. As described above, by incorporating the accessory into an infrared spectrophotometer and measuring the sample, both the infrared spectrum (total reflection spectrum) and the Raman spectrum at the same measurement position of the sample can be easily acquired.

It may be configured such that the excitation light source irradiates the measurement position with the excitation light via the prism. In this case, it may be configured such that the Raman detector detects Raman scattered light guided from the sample to the Raman spectrometer via the prism.

According to the above-described configuration, the measurement position is irradiated with the excitation light from the side opposite to the sample side with respect to the prism, and the Raman scattered light from the sample guided to the side opposite to sample side via the prism is detected by the Raman detector. Therefore, even in cases where another member, such as, e.g., a pressurization mechanism, is provided on the sample side with respect to the prism, the measurement position can be irradiated with the excitation light from the excitation light source and the Raman scattered light from the sample can be detected by the Raman detector without the light being blocked by the member.

It may be configured such that the accessory for an infrared further includes a pressurization mechanism and a light guide. The pressurization mechanism is configured to pressurize the sample and the prism with each other. The light guide is provided in the pressurization mechanism. In this case, the excitation light source may be configured to irradiate the measurement position with the excitation light via the light guide, and the Raman detector may be configured to detect the Raman scattered light guided from the sample to the Raman spectrometer via the light guide.

According to the above-described configuration, the measurement position can be irradiated with the excitation light from the excitation light source via the light guide provided in the pressurization mechanism, and the Raman scattered light from the sample can be detected by the Raman detector. Therefore, even in the configuration in which the pressurization mechanism is provided, the infrared spectrum (total reflection spectrum) and the Raman spectrum can be acquired satisfactorily without the light being blocked by the pressurization mechanism.

Another accessory for an infrared spectrophotometer according to the present invention is an accessory for an infrared spectrophotometer capable of being incorporated between an infrared light source and an infrared detector of an infrared spectrophotometer in which a sample is irradiated with infrared light from an infrared light source and reflected light from the sample is guided by an infrared detector. The accessory for an infrared spectrophotometer is provided with an infrared optical system, an excitation light source, a Raman spectrometer, and a Raman detector. The infrared optical system is configured to irradiate the sample at a measurement position with the infrared light from the infrared light source and guide diffuse reflected light from the sample to the infrared detector. The excitation light source is configured to irradiate the measurement position with excitation light. The Raman spectrometer is configured to disperse Raman scattered light from the sample irradiated with the excitation light. The Raman detector is configured to detect the dispersed Raman scattered light.

According to the above-described configuration, by incorporating an infrared optical system and an excitation light source into the accessory for an infrared spectrophotometer, it is possible to irradiate the same measurement position in a sample guide with the infrared light from the infrared light source of the infrared spectrophotometer and the excitation light from the excitation light source provided in the accessory. The diffuse reflectance spectrum can be acquired by detecting the diffuse reflected light from the sample irradiated with the infrared light by the infrared detector of the infrared spectrophotometer. Further, the Raman spectrum can be acquired by detecting the Raman scattered light from the sample irradiated with the excitation light by the Raman detector provided in the accessory. As described above, by incorporating the accessory into an infrared spectrophotometer and measuring a sample, both the infrared spectrum (diffuse reflectance spectrum) and the Raman spectrum at the same measurement position of the sample can be easily acquired.

It may be configured such that the accessory for an infrared spectrophotometer further includes a light collection mechanism and a light guide. The light collection mechanism is configured to collect infrared light from the infrared light source and irradiate the sample with the infrared light. The light guide is provided in the light collection mechanism. In this case, it may be configured such that the excitation light source irradiates the measurement position with excitation light via the light guide. Further, it may be configured such that the Raman detector detects the Raman scattered light guided from the sample to the Raman spectrometer via the light guide.

According to the above-described configuration, the measurement position can be irradiated with the excitation light from the excitation light source via the light guide provided in the light collection mechanism, and the Raman scattered light from the sample can be detected by the Raman detector. Therefore, even in the configuration in which the light collection mechanism is provided, the infrared spectrum (diffuse reflectance spectrum) and the Raman spectrum can be acquired satisfactorily without the light being blocked by the light collection mechanism.

Effects of the Invention

According to the present invention, by incorporating the accessory into an infrared spectrophotometer and measuring a sample, both the infrared spectrum and the Raman spectrum at the same measurement position of the sample can be easily acquired.

EMBODIMENTS FOR CARRYING OUT THE INVENTION

Figure 1:
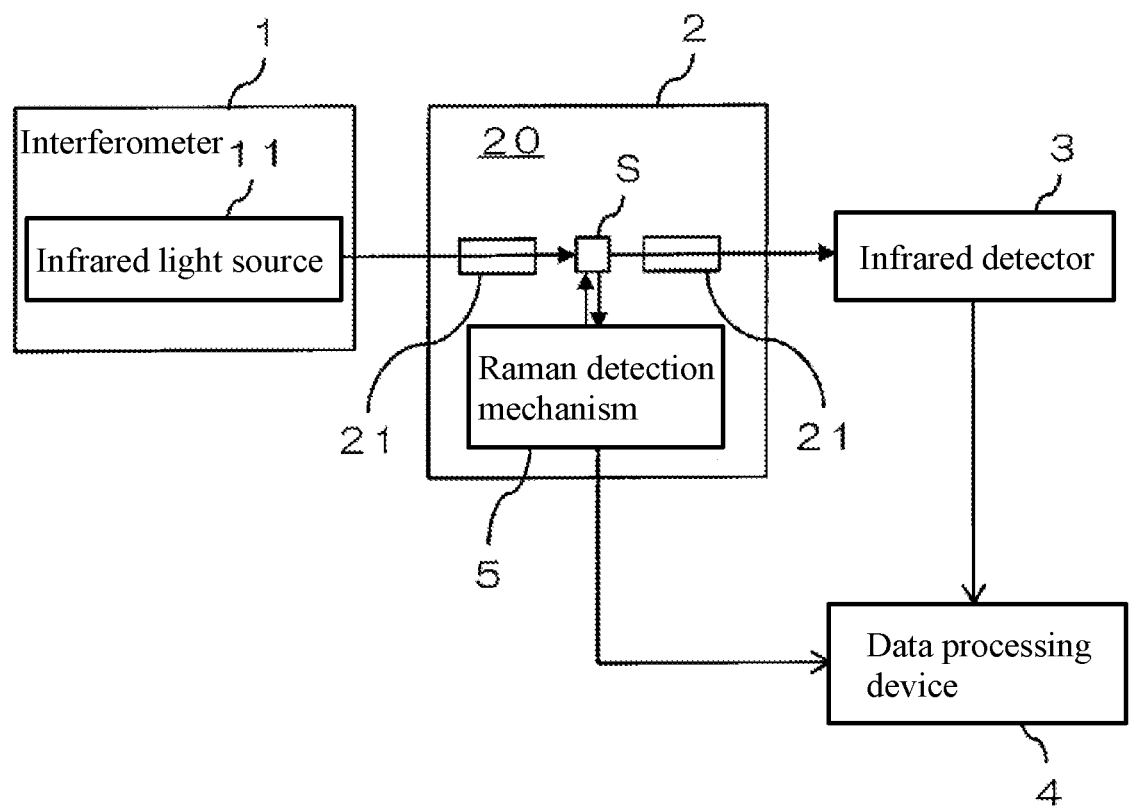
FIG. 1 is a schematic diagram showing an example of a configuration of an infrared spectrophotometer to which the accessory for an infrared spectrophotometer according to an embodiment of the present invention is applied.

FIG. 1 is a schematic block diagram showing an example of a configuration of an infrared spectrophotometer to which an accessory 2 for an infrared spectrophotometer according to an embodiment of the present invention is applied. The infrared spectrophotometer according to this embodiment can measure a spectrum using an ATR (Attenuated Total Reflectance) method or a DRS (Diffuse Reflectance Spectroscopy) by incorporating the accessory 2 for an infrared spectrophotometer (hereinafter simply referred to as "accessory 2"). This infrared spectrophotometer is provided with an interferometer 1, an infrared detector 3, and a data processing device 4. The accessory 2 is detachable on the optical path between the interferometer 1 and the infrared detector 3.

The interferometer 1 is provided with, in addition to an infrared light source 11 for emitting infrared light, a fixed mirror and a movable mirror (both of them are not shown) for interfering with the infrared light from the infrared light source 11. The infrared light emitted from the infrared light source 11 has a wavelength falling within the infrared region of, for example, about 1 µm to about 30 µm.

Within the accessory 2, a sample chamber 20 for placing a sample S is formed. The sample S is, for example, a solid, but may also be a liquid or a gas. Provided in the sample chamber 20 is an infrared optical system 21 for irradiating the sample S with infrared light from the infrared light source 11 and guiding the reflected light from the sample S to the infrared detector 3. As will be described below, the infrared optical system 21 generates totally reflected light or diffuse reflected light from the sample S depending on the configuration and guides the totally reflected light or the diffuse reflected light to the infrared detector 3. The infrared optical system 21 may include, for example, a light guide or a mirror (neither of which is shown). A Raman detection mechanism 5 is provided in the sample chamber 20. This Raman detection mechanism 5 emits excitation light (e.g., monochromatic light of laser light) toward the sample S and detects the Raman scattered light from the sample. The detection signal of the totally reflected light or the diffuse reflected light in the infrared detector 3 and the detection signal of the Raman scattered light in the Raman detection mechanism 5 are amplified with an amplifier circuit (not shown), and then input to the data processing device 4.

The data processing device 4 has a configuration including, for example, a CPU (Central Processing Unit), and the CPU executes a program to perform data processing of the detection signal from the infrared detector 3 and the Raman detection mechanism 5. By the data processing of this data processing device 4, the data of the infrared spectrum (total reflection spectrum or the diffuse reflectance spectrum) and the Raman spectrum is acquired.

Figure 2:
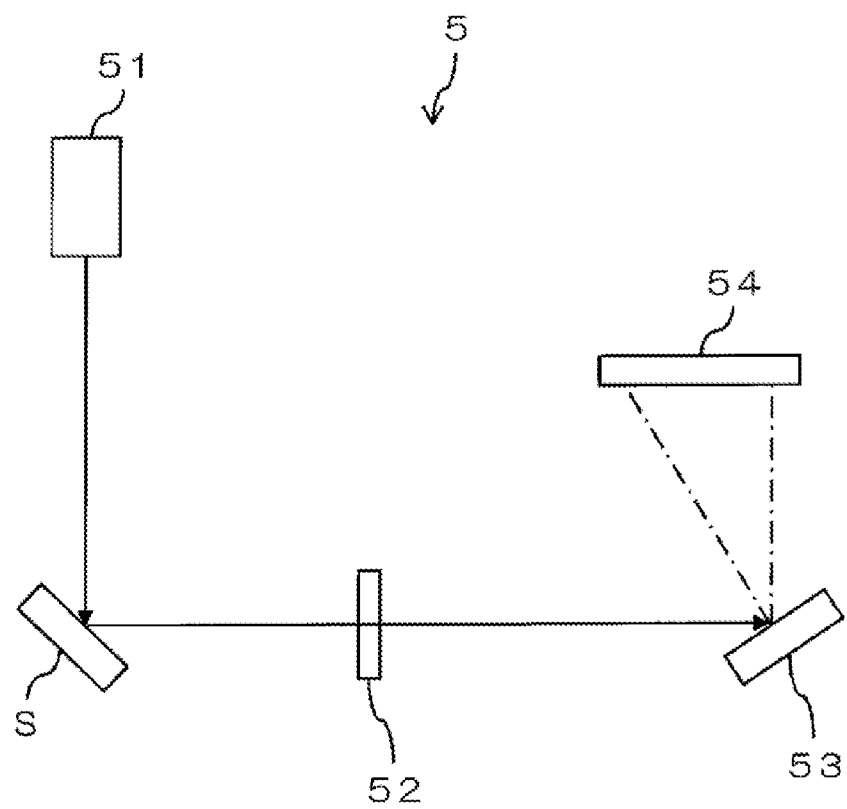
FIG. 2 is a schematic diagram showing an example of a configuration of the Raman detection mechanism.

FIG. 2 is a schematic diagram showing an example of the configuration of the Raman detection mechanism 5. The Raman detection mechanism 5 is provided with, for example, an excitation light source 51, a filter 52, a diffraction grating 53, and a Raman detector 54. Note that in FIG. 2, each member is conceptually shown in an arrangement different from the actual arrangement to facilitate understanding of the description.

The excitation light emitted from the excitation light source 51 is guided to the sample S via a light guide (not shown). The excitation light has a relatively high energy, and the sample S irradiated with this excitation light generates Rayleigh scattered light scattering at the same wavelength as the irradiation light and Raman scattered light scattering at a wavelength different from the irradiation light due to molecular vibrations.

The scattered light generated from the sample S is guided to the filter 52 via the light guide. This filter 52 is, for example, a notch filter, which removes the Rayleigh scattered light and allows only the Raman scattered light to pass through. As a result, only the Raman scattered light generated from the sample S is guided to the diffraction grating 53, so that spectroscopy is performed by the diffraction grating 53. The diffraction grating 53 serves as a Raman spectrometer for dispersing Raman scattered light from the sample S irradiated with the excitation light. The Raman scattered light having the respective wavelengths dispersed by the diffraction grating 53 is detected by the Raman detector 54, and the detection signal from this Raman detector 54 is input to the data processing device 4.

Figure 3A:
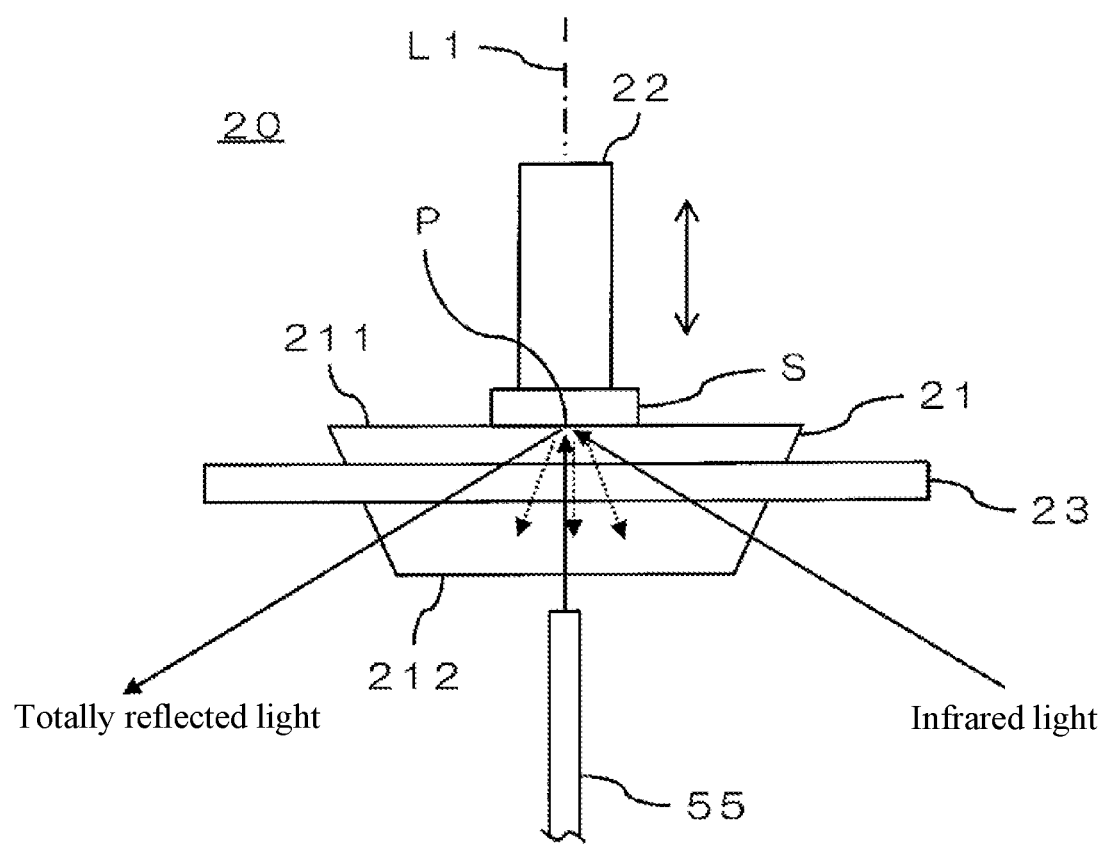
FIG. 3A is a schematic side view showing an example of a specific configuration in a sample chamber.

FIG. 3A is a schematic side view showing an example of a specific configuration in the sample chamber 20. In the example of FIG. 3A, the inner configuration of the accessory 2 in which totally reflected light is generated from a sample S by irradiating the sample S with infrared light and its totally reflected light can be guided to an infrared detector 3 will be described. In addition to the sample S, a prism 21, a pressure bar 22, and the like are arranged in the sample chamber 20.

The prism 21 is formed, for example, in a frusto-conical shape, and is held by a holding plate 23 so that its upper surface 211 and the lower surface 212 extend horizontally and parallel to each other. The sample S is set in the sample chamber 20 in a state of being in contact with the prism 21 by being placed on the upper surface 211 of the prism 21.

For example, germanium (Ge), diamond, or zinc selenide (ZnSe) is used as the material of the prism 21. However, the present invention is not limited to these materials, and the prism 21 may be formed using any material as long as the material has a high refractive index and transmits infrared light.

The pressure bar 22 is arranged above the prism 21 and is vertically movable along the axis L1 by being driven by, e.g., a motor (not shown). As shown in FIG. 3A, by arranging the sample S between the prism 21 and the pressure bar 22, the sample S can be pressed toward the prism 21 side with the tip end surface of the pressure bar 22 by bringing the pressure bar 22 closer to the prism 21 along the axis L1. In this manner, the pressure bar 22, the motor, etc., constitute the pressurization mechanism for pressurizing the sample S and the prism 21 to each other.

The infrared light introduced into the sample chamber 20 from the infrared light source 11 is emitted to the surface of the sample S pressed against the prism 21 side by the pressure bar 22. At this time, the infrared light is emitted via the prism 21 to the measurement position P located at the interface between the sample S and the prism 21 at an incident angle equal to or greater than the total reflection critical angle, and is totally reflected at the measurement position P. The infrared spectrum (total reflection spectrum) can be measured by detecting the totally reflected light from the surface of the sample S with the infrared detector 3 since the infrared light penetrates the sample S slightly (e.g., by a few µm) beyond the measurement position P and is subjected to the inherent absorption at the surface of the sample S. As described above, in this embodiment, the infrared optical system 21 is configured to irradiate the measurement position P positioned at the interface between the sample S and the prism 21 with the infrared light from the infrared light source 11 and guide the totally reflected light from the sample S to the infrared detector 3.

In the sample chamber 20, the tip of the light guide 55 which guides the excitation light from the excitation light source 51 of the Raman detection mechanism 5 is arranged. The light guide 55 is configured by, for example, bundling a plurality of optical fibers, and the sample S is irradiated with the excitation light emitted from the excitation light source 51 via the light guide 55.

The tip of the light guide 55 is arranged coaxially with the axis L1 of the pressure bar 22, for example, on the side opposed to the sample S side with respect to the prism. The excitation light from the excitation light source 51 is emitted from the tip of the light guide 55 along the axis L1 and the measurement position P is irradiated with the excitation light via the prism 21.

The scattered light generated from the sample S re-enters the light guide 55 via the prism 21 and is guided to the filter 52 via the light guide 55. Then, the Raman scattered light passed through the filter 52 is dispersed by the diffraction grating 53 and detected by the Raman detector 54 (see FIG. 2).

As described above, in this embodiment, it is possible to irradiate the same measurement position P in the sample S with the infrared light from the infrared light source 11 of the infrared spectrophotometer and the excitation light from the excitation light source 51 provided in the accessory 2 by incorporating the infrared optical system 21 and the excitation light source 51 into the accessory 2. The total reflection spectrum can be acquired by detecting the totally reflected light from the sample S irradiated with the infrared light by the infrared detector 3 of the infrared spectrophotometer, and the Raman spectrum can be acquired by detecting the Raman scattered light from the sample S irradiated with the excitation light by the Raman detector 54 provided in the accessory 2. As described above, by incorporating the accessory 2 in the infrared spectrophotometer and measuring the sample S, both the infrared spectrum (total reflection spectrum) and the Raman spectrum at the same measurement position P of sample S can be easily acquired.

In particular, in the example shown in FIG. 3A, the measurement position P is irradiated with the excitation light from the side (lower side) opposite to the sample S side with respect to the prism 21, and the Raman scattered light from the sample S guided to the side (lower side) opposite to the sample S side via the prism 21 is detected by the Raman detector 54. Therefore, even in cases where a pressure bar 22 is provided on the sample S side (upper side) with respect to the prism 21 as in this embodiment, the measurement position P can be irradiated with the excitation light from the excitation light source 51, and the Raman scattered light from the sample S can be detected by the Raman detector 54 without the light being blocked by the pressure bar 22.

The measurement of the infrared spectrum (total reflection spectrum) and that of the Raman spectrum may be performed simultaneously, or separately and sequentially. This makes it possible to acquire the infrared spectrum and the Raman spectrum at the same measurement position P of the same sample S in a short time, perform qualitative analyses more accurately based on the molecular structure acquired from both, and continuously confirm the denaturation or reaction process of the sample S.

In cases where the infrared spectrum and the Raman spectrum are measured separately, for example, the infrared spectrum is measured and then the Raman spectrum is measured. However, in cases where the sample S is not denatured by the excitation light from a high energy excitation light source 51, the infrared spectrum may be measured after measuring the Raman spectrum. Note that the present invention can be applied to an on-line measurement in which a change in a sample S is measured using a flow cell (not shown).

Figure 3B:
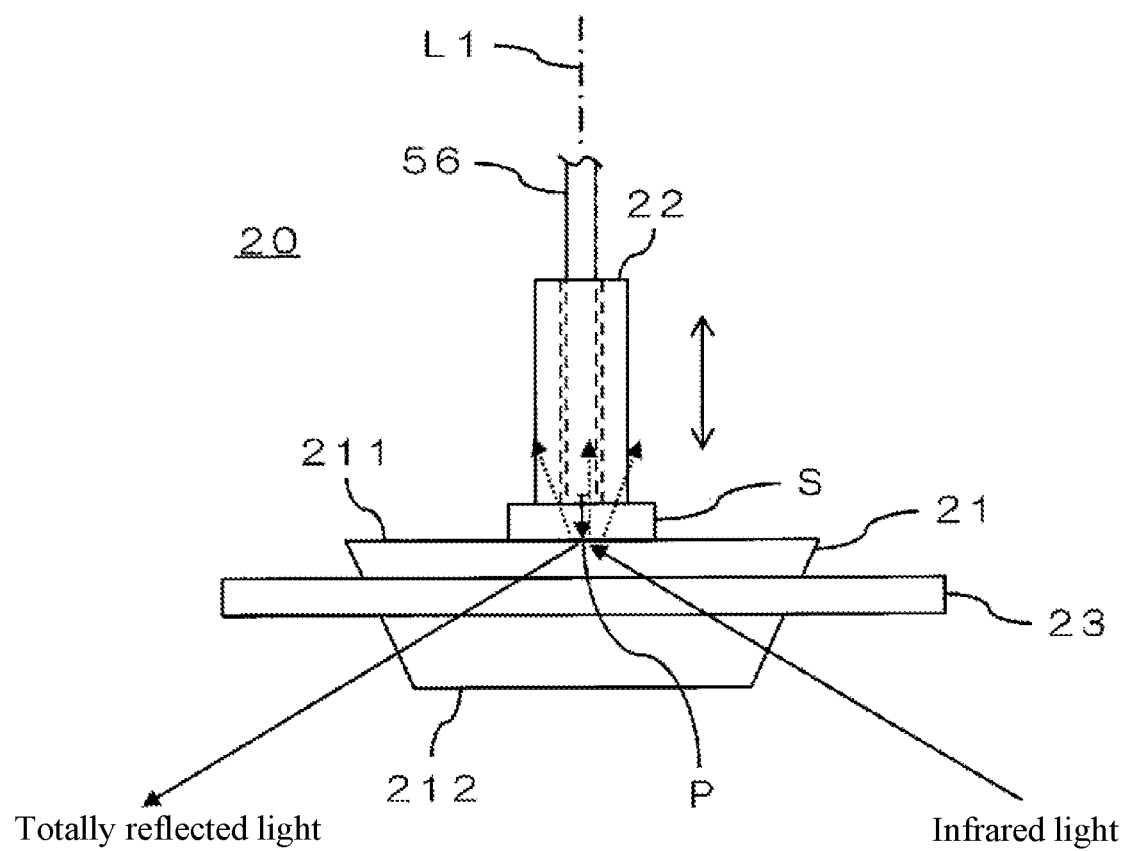
FIG. 3B is a schematic side view showing a modified example of a specific configuration in the sample chamber.

FIG. 3B is a schematic side view showing a modified example of a specific configuration in the sample chamber 20. Also, in this example of FIG. 3B, in the same manner as in the case of FIG. 3A, a prism 21, a pressure bar 22, etc., are arranged in addition to the sample S in the sample chamber 20.

The prism 21 is formed, for example, in a frusto-conical shape, and is held by a holding plate 23 so that its upper surface 211 and lower surface 212 extend horizontally and parallel to each other. The sample S is set in the sample chamber 20 in a state of being in contact with the prism 21 by being placed on the upper surface 211 of the prism 21.

Germanium (Ge), diamond, zinc selenide (ZnSe), etc., are used as the material of the prism 21. However, the present invention is not limited to these materials, and the prism 21 can be formed using any material as long as the material has a high refractive index and transmits infrared light.

The pressure bar 22 is arranged above the prism 21 and is vertically movable along its axis L1 by being driven by, e.g., a motor (not shown). As shown in FIG. 3B, by arranging the sample S between the prism 21 and the pressure bar 22, the sample S can be pressed on the prism 21 side with the tip end surface of the pressure bar 22 by bringing the pressure bar 22 closer to the prism 21 along the axis L1. In this manner, the pressure bar 22, the motor, etc., constitute the pressurization mechanism for pressurizing the sample S and the prism 21 to each other.

The infrared light introduced into the sample chamber 20 from the infrared light source 11 is irradiated onto the surface of the sample S pressed on the prism 21 side by the pressure bar 22. At this time, the infrared light is emitted via the prism 21 to the measurement position P located at the interface between the sample S and the prism 21 at an incident angle equal to or greater than the total reflection critical angle, and is totally reflected at the measurement position P. The infrared spectrum (total reflection spectrum) can be measured by detecting the totally reflected light from the surface of the sample S with the infrared detector 3 since the infrared light penetrates the sample S slightly (e.g., by a few μm) beyond the measurement position P and is subjected to the inherent absorption at the surface of the sample S. As described above, in the same manner as in the example shown in FIG. 3A, the infrared optical system 21 is configured to irradiate the measurement position P positioned at the interface between the sample S and the prism 21 with the infrared light from the infrared light source 11 and guide the totally reflected light from the sample S to the infrared detector 3.

In the sample chamber 20, the tip of the light guide 56 which guides the excitation light from the excitation light source 51 of the Raman detection mechanism 5 is arranged. The light guide 56 is configured by, for example, bundling a plurality of optical fibers, and the sample S is irradiated with the excitation light emitted from the excitation light source 51 via the light guide 56.

The tip of the light guide 56 is provided in the pressurization mechanism by being mounted in the pressure bar 22. Specifically, the pressure bar 22 and the light guide 56 are arranged on the sample S side with respect to the prism 21 by providing the tip of the light guide 56 along the axis L1 of the pressure bar 22 extending vertically. The excitation light from the excitation light source 51 is emitted from the tip of the light guide 56 along the axis L1 and irradiated onto the measurement position P.

The scattered light generated from the sample S re-enters the light guide 56 and is guided to the filter 52 via the light guide 56. Then, the Raman scattered light passed through the filter 52 is dispersed by the diffraction grating 53 and detected by the Raman detector 54 (see FIG. 2).

In the example shown in FIG. 3B, the excitation light can be irradiated from the excitation light source 51 to the measurement position P via the light guide 56 built-in the pressure bar 22, and the Raman scattered light from the sample S can be detected by the Raman detector 54. Therefore, even in the configuration in which the pressure bar 22 is provided as in this embodiment, the light is not blocked by the pressure bar 22, and the infrared spectrum (total reflection spectrum) and the Raman spectrum can be acquired satisfactorily.

However, the pressurization mechanism is not limited to the configuration in which the sample S is pressed against the prism 21 as long as the sample S and the prism 21 can be pressed against each other, and may be a configuration in which, for example, the prism 21 is pressed against the sample S. In this case, the member constituting a pressurization mechanism, such as, e.g., the pressure bar 22, may be arranged not on the sample S side (upper side) with respect to the prism 21 but on the other side (lower side) with respect to the sample S. In such a configuration, in cases where the light guide 56 is incorporated in the pressure bar 22, the measurement position P may be irradiated with the excitation light from the excitation light source 51 emitted from the light guide 56 via the prism 21.

In this embodiment, as shown in FIG. 3A and FIG. 3B, the configuration has been described in which the measurement position P is irradiated with the excitation light via the light guide 55 and 56, and the scattered light from the sample S re-enters the light guide 55 and 56. However, the present invention is not limited to such a configuration, and a configuration may be employed in which the scattered light from the sample S enters another light guide. In this case, one light guide may be provided on the sample S side (upper side) with respect to the prism 21, and the other light guide may be provided on the opposite side (lower side) with respect to the sample S with respect to the prism 21.

Further, the pressurization mechanism is not limited to the configuration having the pressure bar 22 as shown in FIG. 3A and FIG. 3B, and may have a configuration having another member capable of pressurizing the sample S and the prism 21 to each other. In this case, the light guide 55 and 56 is not limited to a configuration built-in the pressure bar 22, and may be a configuration built-in another component constituting pressurization mechanism.

Figure 4:
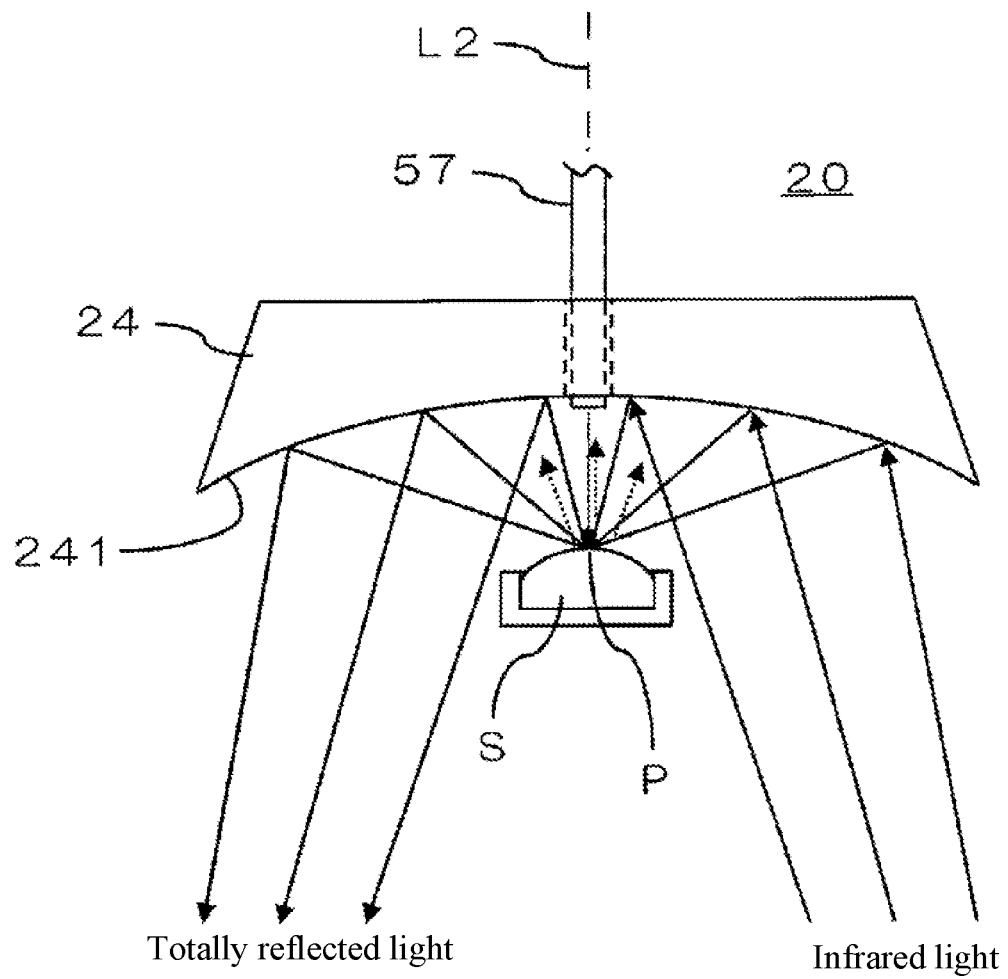
FIG. 4 is a schematic side view showing an example of a specific configuration in the sample chamber in the accessory for an infrared spectrophotometer according to another embodiment.

FIG. 4 is a schematic side view showing an example of a specific configuration in the sample chamber 20 in an accessory 2 for an infrared spectrophotometer according to another embodiment. In the embodiment shown in FIG. 4, the inner configuration of the accessory 2 capable of generating diffuse reflected light from a sample S by irradiating the sample S with infrared light and guiding the diffuse reflected light to the infrared detector 3 will be described. In addition to the sample S, a condensing mirror 24 or the like is arranged in the sample chamber 20.

The condensing mirror 24 has a concave reflective surface 241 and is arranged such that the reflective surface 241 faces the sample S. The infrared light introduced into the sample chamber 20 from the infrared light source 11 is reflected at the reflective surface 241 of the condensing mirror 24 and focused on the measurement position P on the sample S. The diffuse reflected light from the sample S is reflected back at the reflective surface 241 of the condensing mirror 24 and the diffuse reflected light is detected by the infrared detector 3, so that the infrared spectrum (diffuse reflectance spectrum) can be measured. As described above, in this embodiment, the infrared optical system 21 is configured to cause the sample S to be irradiated with the infrared light from the infrared light source 11 at the measurement position P and guide the diffuse reflected light from the sample S to the infrared detector 3.

In the sample chamber 20, the tip of the light guide 57 which guides the excitation light from the excitation light source 51 of the Raman detection mechanism 5 is arranged. The light guide 57 is configured by, for example, bundling a plurality of optical fibers, and the excitation light irradiated from excitation light source 51 is irradiated to the sample S via the light guide 57.

The condensing mirror 24 constitutes a light collection mechanism for collecting the infrared light from the infrared light source 11 and irradiating it to the sample S. The tip of the light guide 57 is provided in the light collection mechanism by being provided in the condensing mirror 24. Specifically, the light guide 57 is arranged on the condensing mirror 24 side with respect to the sample S by providing the tip of the light guide 57 along the axis L2 of the condensing mirror 24. The excitation light from the excitation light source 51 is emitted from the tip of the light guide 57 along the axis L2, so that the measurement position P is irradiated with the excitation light.

The scattered light generated from the sample S re-enters the light guide 57 and is guided to the filter 52 via the light guide 57. Then, the Raman scattered light passed through the filter 52 is dispersed by the diffraction grating 53 and detected by the Raman detector 54 as shown in FIG. 2.

As described above, in this embodiment, it becomes possible to irradiate the same measurement position P in the sample S with the infrared light from the infrared light source 11 of the infrared spectrophotometer and the excitation light from the excitation light source 51 provided in the accessory 2 by incorporating the infrared optical system 21 and the excitation light source 51 in the accessory 2. The Diffuse reflectance spectrum can be acquired by detecting the diffuse reflected light from the sample S irradiated with the infrared light by the infrared detector 3 of the infrared spectrophotometer, and the Raman spectrum can be acquired by detecting the Raman scattered light from the sample S irradiated with the excitation light by the Raman detector 54 provided in the accessory 2. Thus, by incorporating the accessory into the infrared spectrophotometer and measuring the sample S, both the infrared spectrum (diffuse reflectance spectrum) and the Raman spectrum at the same measurement position P of the sample S can be easily acquired.

In particular, in this embodiment, the measurement position P can be irradiated with the excitation light from the excitation light source 51 via the light guide 57 built-in the condensing mirror 24, and the Raman scattered light from sample S can be detected by the Raman detector 54. Therefore, even in the configuration in which the condensing mirror 24 is provided as in this embodiment, the infrared spectrum (diffuse reflectance spectrum) and the Raman spectrum can be acquired satisfactorily without the light being blocked by the condensing mirror 24.

Note that the light collection mechanism is not limited to the configuration having the condensing mirror 24 as shown in FIG. 4, and may have a configuration having a condensing mirror of other shapes, or may have a configuration having a component other than a condensing mirror. In this case, the light guide 57 is not limited to a configuration in which the light guide 57 is mounted in the condensing mirror 24, but may be a configuration in which the light guide 57 is mounted in another component constituting a light collection mechanism.

The measurement of the infrared spectrum (diffuse reflectance spectrum) and that of the Raman spectrum may be performed simultaneously, or separately and sequentially. This makes it possible to acquire the infrared spectrum and the Raman spectrum at the same measurement position P of the same sample S in a short time, perform a qualitative analysis more accurately based on the molecular structure acquired from both of them, and continuously confirm the denaturation or the reaction process of the sample S.

In cases where the infrared spectrum and the Raman spectrum are measured separately, for example, the infrared spectrum is measured and then the Raman spectrum is measured. However, in cases where the sample S is not denatured by the energy excitation light high in energy from the excitation light source 51, the infrared spectrum may be measured after the Raman spectrum is measured. Note that the present invention can be applied to an on-line measurement in which a flow cell (not shown) is used to measure the change in the sample S.

DESCRIPTION OF SYMBOLS

1: interferometer
2: accessory
3: infrared detector
4: data processing device
5: Raman detection mechanism
11: infrared light source
20: sample chamber
21: prism
22: pressure bar
23: holding plate
24: condensing mirror
51: excitation light source
52: filter
53: diffraction grating
54: Raman detector
55: light guide
56: light guide
57: light guide
211: upper surface
212: lower surface
241: reflective surface

The invention claimed is:

1. An accessory for an infrared spectrophotometer configured to be detachably attached between an infrared light source and an infrared detector of an infrared spectrophotometer, the infrared spectrophotometer being configured to irradiate a sample with infrared light from the infrared light source and detect reflected light from the sample with the infrared detector, the accessory comprising:
   a prism with which a sample is brought into contact;
   an infrared optical system configured to irradiate a measurement position positioned at a boundary between the sample and the prism with the infrared light from the infrared light source and guide totally reflected light from the sample to the infrared detector;
   an excitation light source configured to irradiate the measurement position with excitation light;
   a Raman spectrometer configured to disperse Raman scattered light from the sample irradiated with the excitation light; and
   a Raman detector configured to detect dispersed Raman scattered light.

2. The accessory for an infrared spectrophotometer as recited in claim 1,
   wherein the excitation light source irradiates the measurement position with the excitation light via the prism, and
   wherein the Raman detector detects Raman scattered light guided from the sample to the Raman spectrometer via the prism.

3. The accessory for an infrared spectrophotometer as recited in claim 1, further comprising:
   a pressurization mechanism configured to pressurize the sample and the prism with each other; and
   a light guide provided in the pressurization mechanism,
   wherein the excitation light source irradiates the measurement position with the excitation light via the light guide, and
   wherein the Raman detector detects the Raman scattered light guided from the sample to the Raman spectrometer via the light guide.

4. An accessory for an infrared spectrophotometer configured to be detachably attached between an infrared light source and an infrared detector of an infrared spectrophotometer, the infrared spectrophotometer being configured to irradiate a sample with the infrared light from the infrared light source and detect reflected light from the sample with the infrared detector, the accessory comprising:
   an infrared optical system configured to irradiate the sample at a measurement position with infrared light from the infrared light source and guide diffuse reflected light from the sample to the infrared detector;
   an excitation light source configured to irradiate the measurement position with excitation light;
   a Raman spectrometer configured to disperse Raman scattered light from the sample irradiated with the excitation light; and
   a Raman detector configured to detect the dispersed Raman scattered light.

5. The accessory for an infrared spectrophotometer as recited in claim 4, further comprising:
   a light collection mechanism configured to collect infrared light from the infrared light source and irradiate the sample with the infrared light; and
   a light guide provided in the light collection mechanism,
   wherein the excitation light source irradiates the measurement position with the excitation light via the light guide, and
   wherein the Raman detector detects the Raman scattered light guided from the sample to the Raman spectrometer via the light guide.

* * * * *